March 19, 1957  H. H. LIPPINCOTT  2,785,935
DEMOUNTABLE PISTONS FOR PRIME MOVERS
Filed Jan. 26, 1954  2 Sheets-Sheet 1
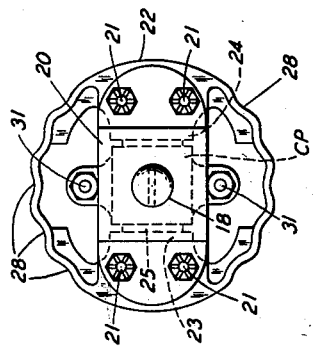
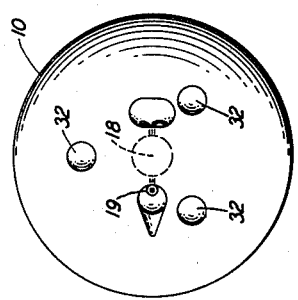
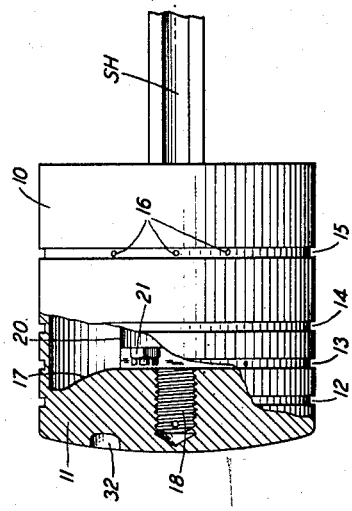
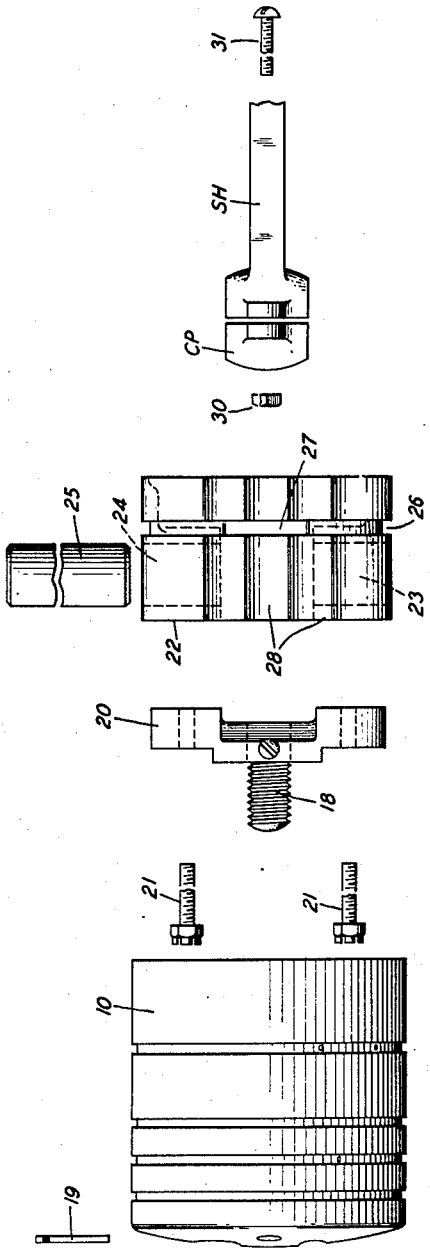
INVENTOR
H. H. LIPPINCOTT
BY
ATTORNEY March 19, 1957     H. H. LIPPINCOTT     2,785,935
DEMOUNTABLE PISTONS FOR PRIME MOVERS
Filed Jan. 26, 1954     2 Sheets-Sheet 2
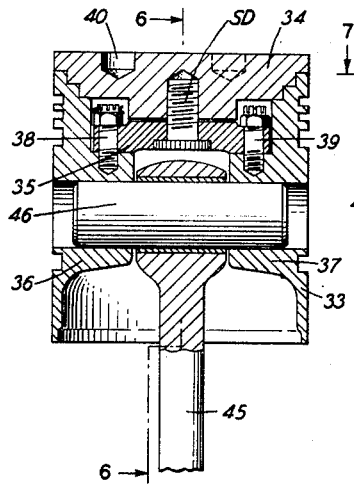
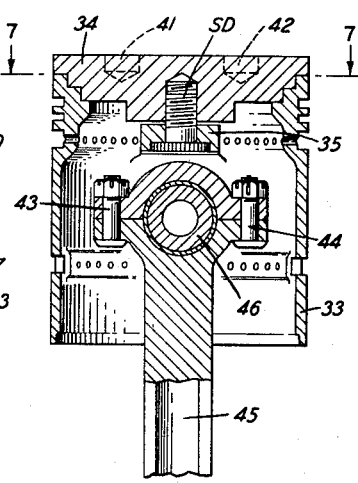
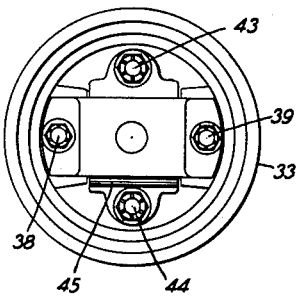
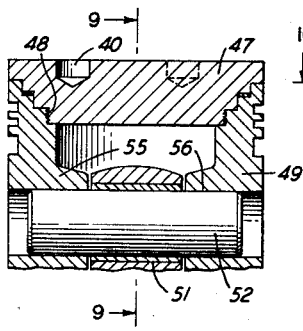
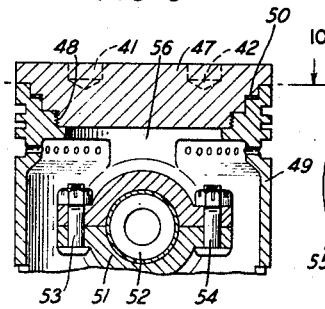
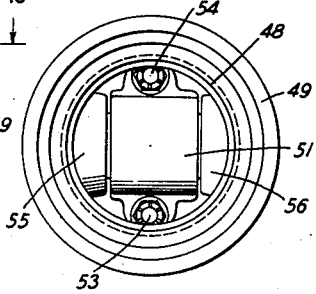
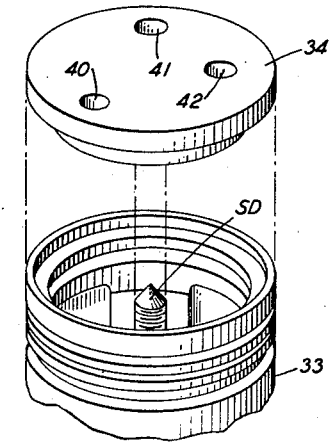
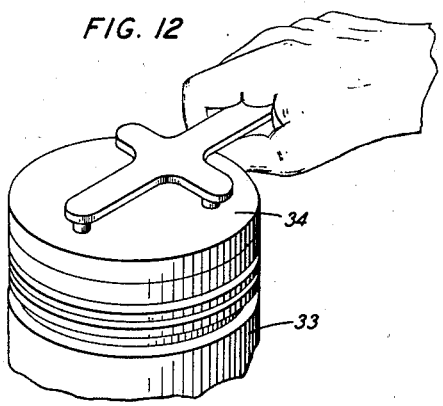
INVENTOR
H. H. LIPPINCOTT
BY
ATTORNEY

United States Patent Office 2,785,935
Patented Mar. 19, 1957

2,785,935

DEMOUNTABLE PISTONS FOR PRIME MOVERS

Haines Hallock Lippincott, Morristown, N. J.

Application January 26, 1954, Serial No. 406,260

4 Claims. (Cl. 309—14)

This invention relates to pistons and the like and more particularly to a readily demountable piston intended for use in internal combustion engines.

One object of my invention is the provision of a piston assembly which may be readily demounted to facilitate its removal from the cylinder wherein it is confined.

Another object of the invention is the provision of a demountable piston wherein the main body portion of the piston is a separate unit of the piston assembly and may be readily removed for inspection or replacement without disturbing the rest of the piston assembly.

A further object of the invention is the provision of a demountable piston which comprises a plurality of cooperating elements which when assembled together, provide a strong, rigid unitary structure.

A still further object of the invention is the provision of a piston wherein the connecting rod is connected to a piston pin which in turn is journaled in a demountable member mounted on the interior of the piston.

A still further object of the invention is the provision of a piston assembly wherein the parts are readily interchangeable and may be replaced with a minimum amount of time and effort.

The piston of my invention has been evolved to provide a demountable piston for use in internal combustion engines wherein it is necessary from time to time to inspect or remove the piston from the cylinder for replacement or repair.

With the pistons in common use today and in particular those used in internal combustion engines of present manufacture, when inspection of the piston or replacement of the piston rings or the piston itself, is required, the cylinder head of the engine must be removed, the oil pan on the crank case dropped, the connecting rod bearing disconnected from the crank shaft and the assembly which includes the piston, piston pin and connecting rod must be removed through the upper portion of the cylinder. This operation not only is time consuming in that the dropping of the oil pan and the connecting rod bearings must be disconnected from the crank shaft, but also the connecting rod bearings are thus disturbed from their adjustment which in most cases is not necessary or required when the pistons themselves must be replaced or inspected.

It is with the ready removal of the piston and its assembly from its cylinder through the top thereof, without disturbing the oil pan or connecting rod bearings, that my invention is concerned and also with a piston assembly which can be readily dismounted to permit its removal.

In the preferred embodiment of my invention, I provide a piston having a strongly reinforced head and a skirt portion having the usual grooves therein for the reception of piston rings. The body portion of the piston is not provided with the customary bearings for the piston pin since in accordance with my invention, the piston pin is journaled in a separate casting mounted inside of the piston skirt and is secured to a yoke member which in turn is secured to the inside surface of the piston head by suitable threaded means. Thus, when it is desired to remove the piston, the top of the main body portion of the piston is rotated counterclockwise by a suitable spanner which engages apertures in the piston head. The structure and the assembly of the piston will be described in detail further on in the specification.

The outer surface of the casting in which the piston pin is journaled is provided on its periphery with longitudinally extending flutes or grooves to provide adequate cooling and to facilitate the distribution of the lubricating oil.

The invention will be more clearly understood from the following detailed description when read in connection with the following drawings of which:

Fig. 1 is an elevational view partly in section and discloses the manner in which the yoke member is secured to the head of the piston;

Fig. 2 is a top plan view of the structure shown in Fig. 1 and discloses the apertures therein for accommodating the spanner;

Fig. 3 is a top plan view of the inner assembly of the structure shown in Fig. 1;

Fig. 4 is an exploded view of the parts which make up the piston as shown in Fig. 4;

Fig. 5 is a longitudinal sectional view of a modified form of my invention in which the piston is in two parts with the head in threaded engagement with a central stud and is readily removable;

Fig. 6 is a view similar to Fig. 5 taken on line 6—6 of Fig. 5;

Fig. 7 is a top plan view taken on line 7—7 of Fig. 6;

Fig. 8 is a fragmentary longitudinal sectional view of a further modification of my invention and discloses the removable head of the piston in threaded engagement with an internally threaded portion on the interior of the piston;

Fig. 9 is a view similar to Fig. 8 but taken on line 9—9 of Fig. 8;

Fig. 10 is a top plan view taken on line 10—10 of Fig. 9;

Fig. 11 is an exploded fragmentary view, in perspective, of the structure shown in Fig. 5; and Fig. 12 is a fragmentary view in perspective and shows the application of the spanner to the piston head.

In the preferred embodiment of my invention as shown in Figs. 1 and 4, the piston assembly of my invention comprises a main body member 10 having a reinforced or heavy walled head portion 11 at the top thereof. The body portion 10 is provided with the usual piston ring receiving grooves 12, 13 and 14 and the oil ring groove 15. The oil ring groove 15 is provided as shown with apertures 16 to permit the passage of oil.

Secured to the inner surface 17 of the head portion 11 by means of the threaded stud 18 and locked against movement by the pin 19, is the yoke member 20. Mounted on the underside of the yoke 20 by means of the threaded studs 21, is the sleeve member 22. The studs 21 as shown, engage threaded apertures in the top portions of the internally extending bosses 23 and 24. The bosses 23 and 24 also serve as bearings for journaling the piston pin 25.

The sleeve 22 is provided, adjacent the lower edge thereof, with a circumferential groove 26 which is apertured at 27 to permit the passage of oil. In order to provide for contraction and expansion and also to assist in the circulation of oil and to facilitate cooling, portions on the periphery of the sleeve are provided with longitudinally extending flutes or grooves 28 as shown in detail in Fig. 3. As shown in Fig. 4 the connecting rod 29 which comprises the cap CP and the shaft SH is secured to the piston pin 25 which in turn as heretofore described, is journaled in the bosses 23 and 24 and is secured by means of the nuts 30 and bolts 31.

In order to facilitate the removal of the body portion 10 from the piston assembly, indentations or recesses are provided in the head 11 of the piston. These recesses are adapted to receive a spanner of the type shown in Fig. 12 which when rotated in a counterclockwise direction, after the pin 19 has been removed, causes the body 10 to rotate and be separated from the piston assembly thereby permitting it to be readily removed from the cylinder in which it is confined without disturbing the piston assembly, which may also be removed by the removal of the bolts 21 and 31, which includes the connecting rod which in turn is journaled on the crank shaft.

In a modified version of my invention as shown in Figs. 5 to 7, inclusive, I have shown a piston assembly which comprises in the main, a body portion 33, a head portion 34 and a yoke member 35. As shown, the yoke member 35 is secured to suitable bosses 36 and 37 located on the interior of the piston body by means of the threaded studs 38 and 39. Projecting upwardly from the yoke 35 is a threaded stud SD which is adapted to engage a centrally threaded aperture in the removable head 34. As shown, the bottom peripheral edge of the head 34 and the upper edge of the body 33 are stepped to provide a perfect joint therebetween. The head 34 is provided with suitable apertures 40, 41 and 42, as shown in detail in Fig. 11 to accommodate the spanner as shown in Fig. 12 to permit the head to be rotated in a counterclockwise direction to permit its removal to provide access to the connecting rod bolts 33 and 34 and to the yoke studs 38 and 39. The structure shown in Figs. 5 to 7 inclusive, incorporate the usual connecting rod 45 and the piston pin 46.

In a further modification as shown in Figs. 8 to 10 inclusive, I have dispensed with the yoke and have provided on the head 47, suitable threads 48 which are adapted to engage internal threads on the stepped portion located at the top of the body member 49. To provide a tight joint between the head 47 and the top of the body member 49 I interpose, between the steps, a gasket 50. As in the structure shown in Figs. 5 and 7, the piston assembly also includes the usual connecting rod 51, piston pin 52, bolts 53 and 54 and the bosses 55 and 56.

From the foregoing it will be readily apparent that with a piston assembly constructed in accordance with my invention, the necessity of removing the entire piston assembly to obtain access to the piston is obviated since the piston may be disconnected from the connecting rod from the top of the cylinder block and withdrawn from the cylinder without removing the connecting rod, its bearings, etc.

While I have shown and described the preferred embodiments of my invention, it is to be understood that various changes and modifications may be made therein without departing from the spirit of the invention and I am only limited by the appended claims.

What is claimed is:

1. A demountable piston assembly for prime movers comprising in combination an elongated, recessed body member closed at its upper end, a sleeve member positioned on the interior of said body and in frictional engagement therewith, oppositely disposed bosses on the interior of said sleeve, a yoke member secured to said bosses having a threaded protuberance extending therefrom and adapted to threadedly engage the inner top portion of said body, and a connecting rod journaled in said sleeve.

2. A demountable piston assembly for prime movers comprising in combination an elongated, recessed body member closed at its upper end, a fluted sleeve member positioned on the interior of said body and in frictional engagement therewith and adjacent the bottom thereof, oppositely disposed bosses on the interior of said sleeve, a yoke member secured to said bosses, threaded means for securing said yoke to said bosses, said yoke having a threaded protuberance extending therefrom and adapted to threadedly engage the inner top portion of said body, and a connecting rod journaled in said sleeve.

3. A demountable piston assembly for prime movers comprising in combination an elongated, recessed body member closed at its upper end, a sleeve member positioned on the interior of said body and in frictional engagement therewith, oppositely disposed bosses on the interior of said sleeve, a yoke member secured to said bosses having a threaded protuberance extending therefrom and adapted to threadedly engage the inner top portion of said body, diametrically opposed, aligned apertures in said bosses, a pin rotatably positioned in said apertures, and a connecting rod rigidly secured to said pin.

4. A demountable piston assembly for prime movers comprising in combination an elongated, recessed body member closed at its upper end, a fluted sleeve member positioned on the interior of said body and in frictional engagement therewith and adjacent the bottom thereof, oppositely disposed bosses on the interior of said sleeve, a yoke member secured to said bosses, threaded means for securing said yoke to said bosses, said yoke having a threaded protuberance extending therefrom and adapted to threadedly engage the inner top portion of said body, diametrically opposed, aligned apertures in said bosses, a pin rotatably positioned in said apertures, and a connecting rod rigidly secured to said pin.

References Cited in the file of this patent

UNITED STATES PATENTS

| Number | Name | Date |
|---|---|---|
| 1,394,898 | Harriman | Oct. 25, 1921 |
| 1,528,182 | Boyer | Mar. 3, 1925 |
| 1,601,776 | Sheiring et al. | Oct. 5, 1926 |
| 1,628,097 | Worth | May 10, 1927 |
| 1,722,635 | Knight | July 30, 1929 |
| 2,040,032 | Steele et al. | May 5, 1936 |
| 2,059,713 | Schneider | Nov. 3, 1936 |
| 2,069,437 | Frank | Feb. 2, 1937 |
| 2,234,124 | Jones | Mar. 4, 1941 |
| 2,362,158 | Ricardo | Nov. 7, 1944 |
| 2,472,288 | Endsley et al. | June 7, 1949 |

FOREIGN PATENTS

| 318,836 | Great Britain | Sept. 9, 1929 |